2 Sheets—Sheet 1.

A. L. BLANCHARD.

Heating Drum.

No. 54.

Reissued Sept. 9, 1843.

N. PETERS, Photo-Lithographer, Washington, D. C.

2 Sheets—Sheet 2

A. L. BLANCHARD.

Heating Drum.

No. 54. Reissued Sept. 9, 1843.

N. PETERS, Photo-Lithographer, Washington, D. C.

UNITED STATES PATENT OFFICE.

ALONZO L. BLANCHARD, OF ALBANY, NEW YORK.

IMPROVEMENT IN THE METHOD OF CONSTRUCTING A COMBINED DUMB AND PARLOR STOVE.

Specification forming part of Letters Patent No. 2,355, dated November 12, 1841; Reissue No. 54, dated September 9, 1843.

*To all whom it may concern:*

Be it known that I, ALONZO L. BLANCHARD, of the city and county of Albany, and State of New York, have invented a new and useful Dumb or Radiator and Parlor Stove; and I do hereby declare that the following is a full, clear, and exact description thereof, reference being had to the drawings accompanying the same—

Figure 1:
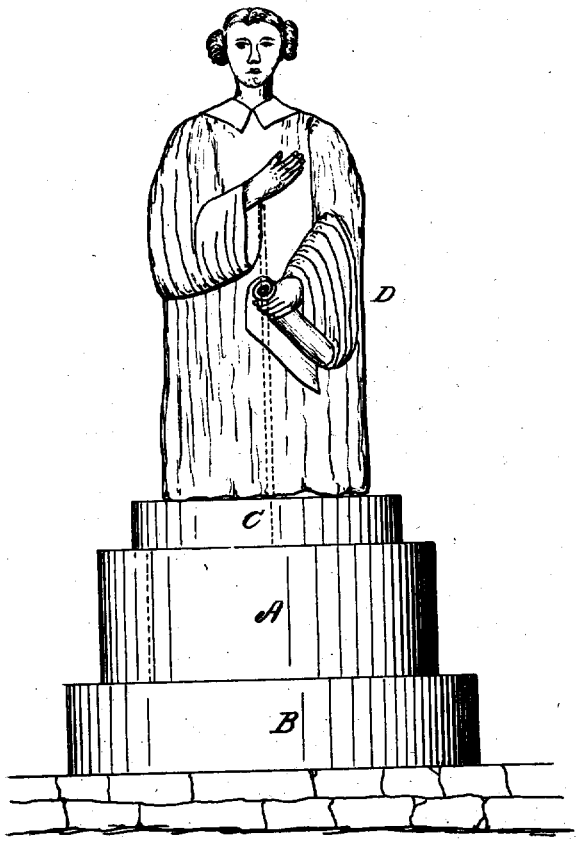
Figure 2:
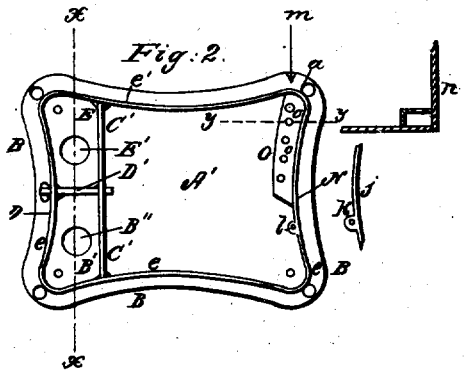
Figure 3:
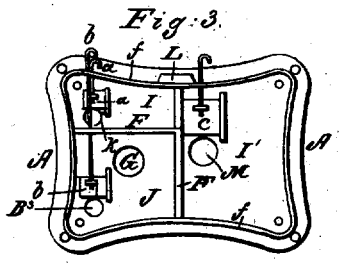
Figure 5:
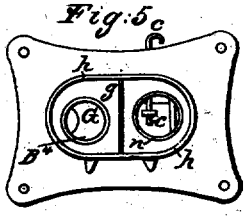
Figure 4:
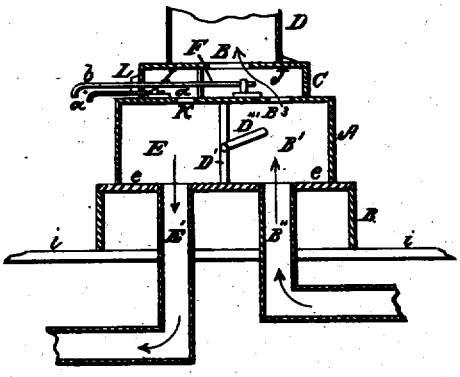

Figure 1 being an exterior view; Fig. 2, a horizontal section of segment A, Fig. 1, of pedestal; Fig. 3, a horizontal section of segment C, Fig. 1, of pedestal; Fig. 4, a vertical section through the pedestal in the line *x x* of Fig. 2; Fig. 5, top plate of the pedestal.

The design of this stove is to furnish, under the appearance of a pedestal or another analogous device surmounted by a statue, all the advantages both of a well-constructed dumb or radiator stove and a parlor stove in which fire can be made when an increased temperature is required, or when there is not any in the kitchen or other apartment below that in which the dumb-stove is situated.

The pedestal A B C, Fig. 1, upon which the hollow cast statue D is sustained, is represented in Fig. 1 as divided into three members, segments, or parts exteriorly. These parts may be made to assume any form not incompatible with their general intention which taste or fancy may dictate. The lower segment, B, is merely a hollow base or plinth for sustaining the stove and other parts above it. It serves also to conceal the two pipes which pass through the floor, and through one of which pipes the heated air from below is conveyed into the dumb-stove, and through the other of which said air is finally to escape into a chimney or flue. The middle segment or member of the pedestal, A, contains a fire-chamber, within which fire may be lighted when required, and also contains compartments or chambers which are entered by the two pipes that pass through the floor, said chambers constituting a part of the dumb-stove.

In Fig. 2, *e e e* represent the lower horizontal plate of the segment A, Fig. 1, the space within which is divided into three chambers or compartments, A′, B′, and E, by a vertical partition-plate, C′ C′, extending from front to back, and by a partition, D′, which extends from the partition C′ to the end D″ of the segment A, dividing this end into two compartments, B′ and E, into one of which enters the heated-air pipe B″, and into the other of which enters the escape or exit pipe E. The upper part of the partition D′ constitutes a valve-shutter, which may be opened or closed by means of a handle, D″. When opened the compartments B and E′ communicate with each other. The larger compartment A′ forms the fire-chamber of the parlor-stove.

Fig. 4 is a vertical section through the pedestal in the line *x x* of Fig. 2. In this figure the pipes B″ and E′ are shown as entering the chambers B′ and E. The dotted line D‴ also shows the upper or valve part of the partition D′ as partially opened.

In Fig. 3, *f f* is the lower part of the segment C of the pedestal dividing this from the above-described chambers within the segment A. The space within the segment C has a partition extending from the bottom to the top of it in the lines F F′, by which the chamber is divided into two compartments, I I and J. There are two openings, G and M, through the plate *f f* into the fire-chamber A′, Fig. 2. One of these, G, opens into the compartment J, and the other, M, into the compartment I I. From the compartment J there is also an opening, $B^3$, into the compartment B′ of Fig. 2, which opening $B^3$ is governed by a valve-shutter or damper *b*. From the compartment I I there is an opening, K, into the compartment E of Fig. 2, which opening is governed by a valve, *a*. The opening M into the fire-chamber A′ is governed by the valve *c*.

Fig. 5 represents the top plate of the upper segment, C, of the pedestal, or that upon which the statue stands, *h h* being the line of its lower end. Through this plate there are two openings, $B^4$ and H. For two-thirds (more or less) of its height the statue D has a vertical partition, commencing at its lower end and extending in any direction across it that may be most convenient. The lower part of this partition is shown by the line *g*, and its place is shown in dotted lines on the statue. The opening $B^4$ on one side of the partition *g* leads into the compartment J, Fig. 3, and the opening H into the compartment I I.

When the apparatus is to be used as a dumb-stove only, its operation is as follows: In the sectional view, Fig. 4, B″ is the pipe conveying the heated air from the fire below through the floor *i i*, and through the lower plate, *e e*, of the middle portion, A, of the pedestal into the chamber B′. At the upper side of this chamber said heated air passes through the opening $B^3$ into the compartment J of the upper segment of the pedestal. Through the opening $B^4$ in the upper plate of this segment it passes into the body of the statue, upon one side of the partition *g*, and down on the other to the opening H, through that opening to the compartment I, along which it passes to the opening K, then through this to the compartment E of the middle segment, A, of the pedestal. Thence it escapes through the exit-pipe E′, leading to a chimney or flue below the floor. When the fire is first lighted, or when it is desired to lessen the heat of the dumb-stove, the damper making a part of the partition D′ is to be opened, and the smoke and heated air will then pass directly from the compartment B′ into the compartment E without ascending into the statue. The draft, instead of making its escape through the pipe E′, may be conducted directly from the pedestal into the parlor fire-place, if desired. For this purpose there may be a flue at L, Figs. 3 and 4, leading from the compartment I at the back of the pedestal into the fire-place. When this is used, the damper *b* should be closed.

I will now describe the operation of the foregoing apparatus when it is to be used as a parlor-stove.

The door for the supply of fuel I make in one end of the segment A, as at N, Fig. 2, and this door I construct so as to conceal the hinges and preserve the uniform character of the pedestal. This I effect in the following manner.

In Fig. 2, *j* may represent the upper or the lower edge of the door. On the inside of this door there are two ears, *k*, with a bolt or joint pin hole through them, and on the inside of the fire-chamber there are two corresponding ears, *l*. Through these a bolt or joint pin is to be passed. The plate forming the door may then be entirely flush on its outside with the other part of the pedestal, and it will yet open and close freely.

There may be an ash-pit drawer in the plinth at the back of the pedestal, if desired; but this I in general omit altogether and introduce the draft into the fire-chamber through a small opening in the rear of the pedestal, as at *d*, to which opening the arrow *m* points. This opening leads into a small trunk or hollow case, O, extending along the front of the fire-chamber on its bottom plate, said case having through its top or side openings *o o o* for the admission of air to the fire-chamber. When a fire has been kindled in the fire-chamber, and it is desired to derive the whole benefit of its heat therefrom, the opening E in the plate *f f* is to be closed by the damper or valve *c*. The whole of the heated air from the fire-chamber will then be compelled to pass through the opening G into the chamber J, and its course thence will be the same with that already described as performed by the heated air from a fire below the apartment. The final escape of said heated air may in like manner be either through the pipe E′, or through a pipe from L into the chimney.

The above-described apparatus has less the appearance of a stove and is more ornamental than any other which I have ever known.

The statue, besides being elegant in its appearance, forms a constituent part of the instrument, and exposes a large radiating surface, and this, together with that afforded by the pedestal, renders it particularly available in the distribution of heat, and these advantages it presents, whether used as a dumb-stove only, as a parlor-stove, or as both in combination.

It may be used with facility in apartments which are not furnished with fire-places, as well as in those that are so provided.

I do not claim the mere combining of a dumb-stove with a compartment within said stove in which an extra fire may be kindled, this having been done or attempted by others, but in a manner and under an arrangement of parts differing essentially from those herein described, and to which particulars my claims are limited.

What I claim as my invention, and desire to secure by Letters Patent, is—

1. A hollow statue constructed substantially as herein described, combined with a fire-chamber below, with hot-air pipes or stove in its base or pedestal, so as to constitute a radiator or dumb-stove, through which the heated air from the fire below shall circulate within the body and base of the statue, divided into compartments, substantially in the manner set forth.

2. The combining with such a dumb-stove as herein described a fire-chamber, by means of which it may be converted into a parlor-stove, said combination being formed by arranging the respective openings, chambers, and dampers substantially in the manner herein fully made known.

3. The manner of supplying the draft to the fire-chamber through the trunk or hollow case, located and arranged as herein made known.

ALONZO L. BLANCHARD.

Witnesses:

J. J. GREENOUGH,

W. A. GODDARD.